United States Patent
Mobley et al.

(10) Patent No.: US 11,651,093 B1
(45) Date of Patent: May 16, 2023

(54) AUTOMATED FRAUDULENT DOCUMENT DETECTION

(71) Applicant: LendingClub Bank, National Association, Lehi, UT (US)

(72) Inventors: Anton Mobley, Johns Creek, GA (US); Jixin Li, Ellicott City, MD (US); Nickolaus Mueller, North Potomac, MD (US)

(73) Assignee: LendingClub Bank, National Association, Lehi, UT (US)

( * ) Notice: Subject to any disclaimer, the term of this patent is extended or adjusted under 35 U.S.C. 154(b) by 0 days.

(21) Appl. No.: 17/680,260

(22) Filed: Feb. 24, 2022

(51) Int. Cl.
*G06Q 30/00* (2012.01)
*G06F 21/62* (2013.01)
*G06F 16/93* (2019.01)
*G06Q 30/018* (2023.01)

(52) U.S. Cl.
CPC .......... *G06F 21/6209* (2013.01); *G06F 16/93* (2019.01); *G06Q 30/0185* (2013.01)

(58) Field of Classification Search
None
See application file for complete search history.

(56) References Cited

U.S. PATENT DOCUMENTS

| | | | |
|---|---|---|---|
| 6,718,535 B1 * | 4/2004 | Underwood | G06F 9/451 717/101 |
| 6,850,252 B1 * | 2/2005 | Hoffberg | H04N 21/475 380/252 |
| 7,054,461 B2 * | 5/2006 | Zeller | G06T 1/0078 382/103 |
| 7,630,520 B2 * | 12/2009 | Visan | G06V 10/28 382/137 |

(Continued)

FOREIGN PATENT DOCUMENTS

| | | | | |
|---|---|---|---|---|
| EP | 1662699 A1 * | 5/2006 | | G06F 21/64 |
| JP | 2006157914 A * | 6/2006 | | G06F 21/64 |

(Continued)

OTHER PUBLICATIONS

Muda et al. "Computational Intelligence in Digital Forensics: Forensic Investigation and Applications." (2014). Retrieved online Jul. 18, 2022. https://link.springer.com/content/pdf/10.1007%2F978-3-319-05885-6.pdf (Year: 2014).*

(Continued)

*Primary Examiner* — James A Reagan
(74) *Attorney, Agent, or Firm* — Hickman Becker Bingham Ledesma LLP

(57) ABSTRACT

Techniques are disclosed for determining the authenticity of a digital-origin document based, at least in part, on the code of the document. By determining authenticity based on the code of the document, authentication may take into account several features that are not detectable on the rendered image of a digital-origin document. The document class of a target document is initially determined. Anomalies are then detected in the code using various detectors, including but not limited to metadata-based detectors and content-based detectors. The output of the detectors may be combined to generate a document anomaly score that indicates likelihood that the document is not authentic.

18 Claims, 10 Drawing Sheets

(56) References Cited

U.S. PATENT DOCUMENTS

| | | | | |
|---|---|---|---|---|
| 7,813,822 | B1* | 10/2010 | Hoffberg | H04N 7/163 381/73.1 |
| 7,920,714 | B2* | 4/2011 | O'Neil | G07D 7/2016 382/209 |
| 7,974,714 | B2* | 7/2011 | Hoffberg | H04N 21/4318 360/75 |
| 8,359,271 | B2* | 1/2013 | Peckover | H04L 63/08 705/50 |
| 8,428,332 | B1* | 4/2013 | Csulits | G07D 7/2033 235/379 |
| 8,433,123 | B1* | 4/2013 | Csulits | G07F 19/202 235/379 |
| 8,437,530 | B1* | 5/2013 | Mennie | G06Q 20/108 235/379 |
| 8,600,830 | B2* | 12/2013 | Hoffberg | G06Q 30/08 705/14.71 |
| 8,799,770 | B2* | 8/2014 | Morris | G06F 40/143 726/28 |
| 8,874,477 | B2* | 10/2014 | Hoffberg | G06Q 10/0635 705/37 |
| 9,225,519 | B1* | 12/2015 | Fraccaroli | G06F 16/381 |
| 9,311,670 | B2* | 4/2016 | Hoffberg | G06Q 20/0652 |
| 9,444,645 | B2* | 9/2016 | Biot-Lefevre | H04L 63/08 |
| 9,818,136 | B1* | 11/2017 | Hoffberg | G07F 17/32 |
| 10,262,272 | B2* | 4/2019 | Chickering | G06N 20/00 |
| 10,636,040 | B2* | 4/2020 | Peckover | G06F 21/10 |
| 10,693,872 | B1* | 6/2020 | Larson | G06F 21/31 |
| 11,354,435 | B2* | 6/2022 | Brannon | H04L 67/306 |
| 11,380,115 | B2* | 7/2022 | Wu | G06V 10/443 |
| 11,405,189 | B1* | 8/2022 | Bennison | H04L 9/0656 |
| 2007/0053513 | A1* | 3/2007 | Hoffberg | G06V 40/103 380/201 |
| 2007/0087756 | A1* | 4/2007 | Hoffberg | G06Q 10/0631 455/450 |
| 2008/0025555 | A1* | 1/2008 | Visan | G06V 30/19013 382/100 |
| 2008/0025556 | A1* | 1/2008 | Visan | G06V 10/28 382/100 |
| 2008/0030798 | A1* | 2/2008 | O'Neil | G07D 7/206 358/448 |
| 2009/0152357 | A1* | 6/2009 | Lei | G06F 16/93 235/454 |
| 2010/0037059 | A1* | 2/2010 | Sun | H04N 1/32144 713/176 |
| 2010/0235285 | A1* | 9/2010 | Hoffberg | G06Q 20/308 705/37 |
| 2011/0038012 | A1* | 2/2011 | Massicot | H04N 1/32133 382/100 |
| 2012/0072859 | A1* | 3/2012 | Wang | G06V 30/40 715/764 |
| 2012/0327450 | A1* | 12/2012 | Sagan | G03G 21/046 358/1.14 |
| 2014/0046954 | A1* | 2/2014 | MacLean | G06F 21/645 707/736 |
| 2014/0119615 | A1* | 5/2014 | Mercolino | G06K 7/00 382/112 |
| 2014/0259157 | A1* | 9/2014 | Toma | G06Q 50/265 726/22 |
| 2016/0110826 | A1* | 4/2016 | Morimoto | G06F 16/285 705/311 |
| 2017/0214701 | A1* | 7/2017 | Hasan | H04L 63/1491 |
| 2017/0250855 | A1* | 8/2017 | Patil | H04L 47/827 |
| 2017/0264640 | A1* | 9/2017 | Narayanaswamy | H04L 63/20 |
| 2018/0033020 | A1* | 2/2018 | Viens | G06Q 30/0185 |
| 2018/0075138 | A1* | 3/2018 | Perram | G06F 16/93 |
| 2018/0268015 | A1* | 9/2018 | Sugaberry | G06N 3/049 |
| 2018/0349693 | A1* | 12/2018 | Watanabe | G06V 30/416 |
| 2020/0301979 | A1* | 9/2020 | Alexiades | G06F 16/93 |
| 2020/0366671 | A1* | 11/2020 | Larson | G06F 21/31 |
| 2021/0110037 | A1* | 4/2021 | Hunt | G06F 21/554 |
| 2021/0124919 | A1* | 4/2021 | Balakrishnan | G06V 30/245 |
| 2021/0133498 | A1* | 5/2021 | Zhang | G06K 9/6255 |
| 2021/0279212 | A1* | 9/2021 | Kazmi | G06F 16/2379 |
| 2021/0295103 | A1* | 9/2021 | Tanniru | G06V 30/36 |
| 2022/0358583 | A1* | 11/2022 | Sliwka | G06Q 20/3678 |

FOREIGN PATENT DOCUMENTS

| | | | | |
|---|---|---|---|---|
| JP | | 2007318732 A | * 12/2007 | H04N 1/32101 |
| WO | | WO-2008014590 A1 | * 2/2008 | G06K 9/38 |

OTHER PUBLICATIONS

How Its Done. "A Simplified Guide To Forensic Document Examination." (Aug. 11, 2012). Retrieved online Jul. 18, 2022. https://www.forensicsciencesimplified.org/docs/how.html (Year: 2012).*

Talib M. Jawad Abbas. "Studying the Documentation Process in Digital Forensic Investigation Frameworks/ Models." (2015). Retrieved online Jul. 18, 2022. https://www.iasj.net/iasj/download/6e2dd4cac5720eb3 (Year: 2015).*

Clifford Lynch. "Authenticity and Integrity in the Digital Environment: An Exploratory Analysis of the Central Role of Trust." (2009) Retrieved online Jul. 18, 2022. https://www.clir.org/pubs/reports/pub92/lynch/ (Year: 2009).*

Exploringtheinvisible.org. "Behind the Data: Investigating metadata." (Nov. 30, 2017). Retrieved online Jul. 18, 2022. https://exposingtheinvisible.org/en/guides/behind-the-data-metadata-investigations/ (Year: 2017).*

Kindson Munonye et al. "Machine learning approach to vulnerability detection in OAuth 2.0 authentication and authorization flow." (May 13, 2021). Retrieved online Dec. 20, 2022. https://link.springer.com/article/10.1007/s10207-021-00551-w (Year: 2021).*

K. A. Apoorva et al. "Deep neural network and model-based clustering technique for forensic electronic mail author attribution." (Feb. 18, 2021). Retrieved online Dec. 20, 2022. https://link.springer.com/article/10.1007/s42452-020-04127-6 (Year: 2021).*

Redis.com, "Real-Time Fraud Detection with Redis Enterprise", https://redis.com/solutions/use-cases/fraud-detection/, retrieved May 2, 2022, 9 pages.

Malan et al., "A Survey of Automated Financial Statement Fraud Detection with Relevance to the South African Context", South African Computer Journal 32(1), https://doi.org/10.18489/sacj.v32il.777, dated Jul. 2020, 40 pages.

Fraud-Magazine.com, "Automating Fraud Detection: The Essential Guide", https://www.fraud-magazine.com/whitepapers/Whitepaper_Automating_Fraud_Detection_Guide.pdf, Year 2014, 8 pages.

* cited by examiner

Your Adv Plus Banking for January 5, 2021 to February 25, 2021

KELLY SOPHILIA

Account summary

| | |
|---|---:|
| Beginning balance on January 5, 2021 | $15,018.19 |
| Deposits and other additions | 5,053.47 |
| Withdrawals and other subtractions | -11,807.41 |
| Checks | -0.00 |
| Service fees | -0.00 |
| Ending balance on February 25, 2021 | $8,264.25 |

FIG. 5

Marrpay Pay Statement
CONFIDENTIAL - RETAIN FOR TAX PURPOSES

| | | | |
|---|---|---|---|
| Week Ending Date | 06/30/2021 | Total Hrs/Days Worked | 0 |
| Pay Period Start Date | 06/17/2021 | Gross Pay | 15.29 |
| Pay Period End Date | 06/30/2021 | Taxes | 0.00 |
| Weeks Paid | 0 | Ded & Adj | 0.00 |
| Check Date | 07/05/2021 | Net Pay | 15.29 |
| Check Number | 0072253410 | Check Amount | 0.00 |

Bank Accumulators

FIG. 6

Marrpay Pay Statement
CONFIDENTIAL - RETAIN FOR TAX PURPOSES

| | |
|---|---|
| Week Ending Date: | 06/30/2021 |
| Pay Period Start Date: | 06/17/2021 |
| Pay Period End Date: | 06/30/2021 |
| Weeks Paid: | 0 |
| Check Date: | 04/05/2018 07/03/2021 |
| Check Number: | 0072223410 |

AUTOMATED FRAUDULENT DOCUMENT DETECTION

FIELD OF THE INVENTION

The present invention relates to fraud detection and, more specifically, to techniques for automatically determining whether a digital document is authentic.

BACKGROUND

In recent years, an increasing number of more people and companies are "going paperless". In some cases, "going paperless" means the use of digital copies of what was originally a physical (usually paper) document. In other cases, "going paperless" means that even the original version of a document is digital. Documents whose original version is digital are referred to herein as "digital-origin documents". As an example, the receipts generated by some point-of-sale systems are digital-origin documents. Specifically, such systems can generate and send digital receipts to the email address of a purchaser without ever printing a physical receipt. Other examples of digital-origin documents include paystubs, bank statements, etc. With digital-origin documents, a digital copy of the document may be bit-for-bit identical to the original document.

One popular format for digital-origin documents is the "Portable Document Format" (referred to herein as "PDF") created by Adobe. A description of PDF is available at en.wikipedia.org/wiki/PDF, the contents of which are incorporated herein by reference. A comprehensive reference to PDFs and how they work is available at www.adobe.com/content/dam/acom/en/devnet/pdf/pdfs/pdf_reference_archives/PDFReference.p df, the contents of which are incorporated herein by this reference. In general, PDF includes a subset of the PostScript page description programming language, a font-embedding/replacement system, and a structured storage system to bundle the components of the document into a single file. The format of a PDF file is a subset of a COS (Carousel Object Structure) format, which includes a COS tree of objects.

One approach for determining whether a PDF document is authentic involves (a) rendering the PDF document, (b) capturing the image of the rendered PDF document (typically in JPEG image format), and (c) analyzing the JPEG image for signs of tampering. For example, analysis of the JPEG image may detect use of inconsistent fonts, inconsistent spacing between characters, misalignments, portions of the document that do not display exactly where they should be, etc.

Unfortunately, determining authenticity of a document through image analysis has several drawbacks. For example, it is not uncommon for users to add annotations to a PDF document for legitimate reasons. For example, a user may draw a circle around the total amount displayed on a digital receipt. As another example, a user may type an annotation on a bank statement explaining the purpose of a particular deposit or withdrawal. Such annotations show up in the image of the document, and may cause an automated image analyzer to conclude that the document is fraudulent. Documents flagged as fraudulent may necessitate human review, which may be expensive and time consuming. Further, image analysis is necessarily limited to fraud-indicating clues that are visible in the rendered image of a document.

It would clearly be beneficial to have an automated process for determining the authenticity of digital documents that is able to distinguish between legitimate annotations (e.g. circling an amount shown on a receipt) and fraudulent annotations (e.g. a change in the amount shown on a receipt). It would be further beneficial to have an automated process for determining authenticity based on clues that are not visible or detectable in the captured image of a rendered document.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 2 is a block diagram of a user interface displaying regions that correspond to editing tag anomalies;

FIG. 3 is a block diagram of a user interface displaying regions that correspond to mask-overlap anomalies;

FIG. 5 is a block diagram of a user interface displaying regions that correspond to multiple-fonts-types-within-element anomalies;

FIG. 6 is a block diagram of a user interface displaying regions that correspond to annotation-masks anomalies;

FIG. 7 is a block diagram that illustrates an example of a benign annotation;

DETAILED DESCRIPTION

Figure 1:
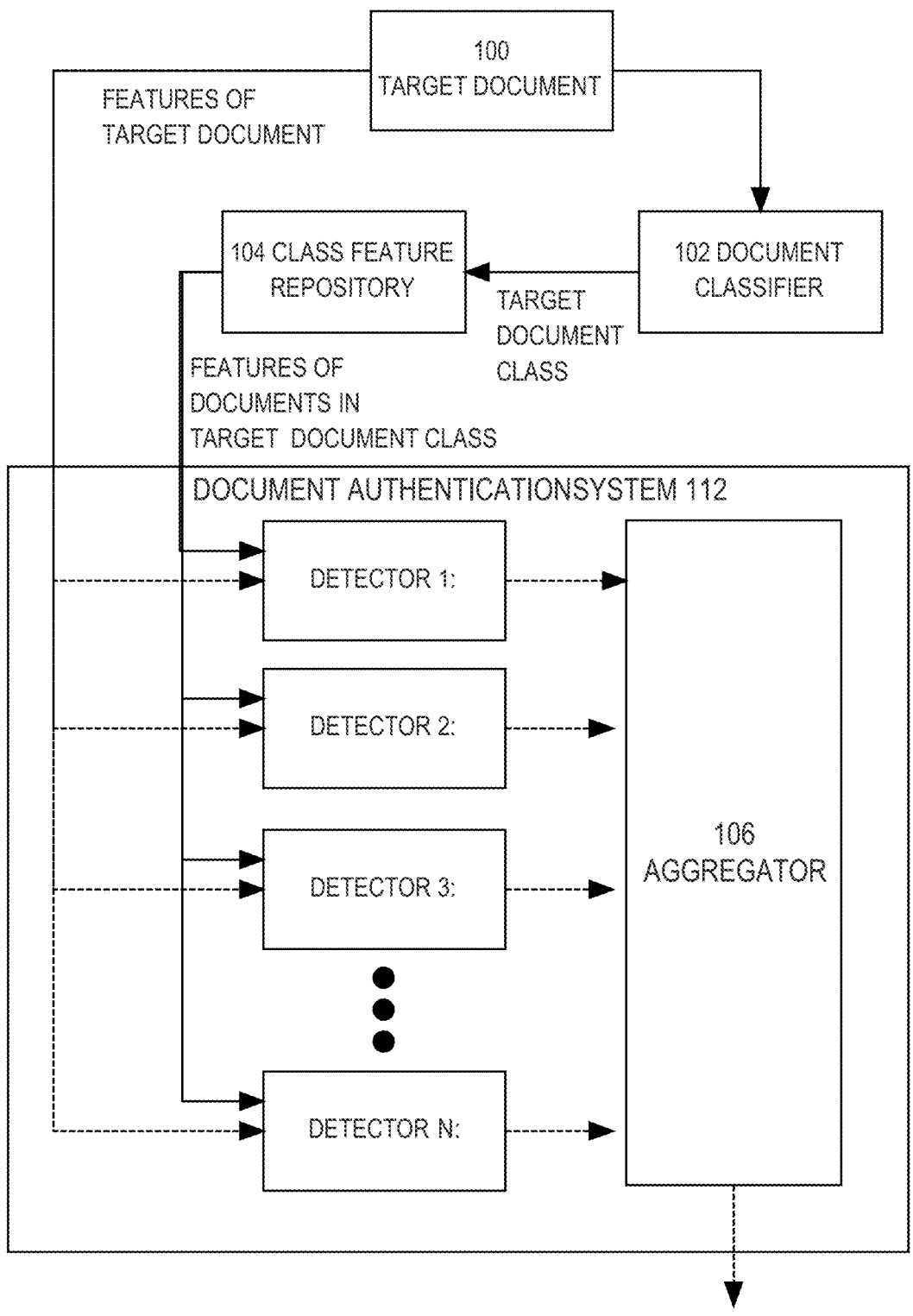
FIG. 1 is a block diagram of a document authentication system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided for determining the authenticity of a digital-origin document based, at least in part, on the PDF code of the document rather than exclusively on an analysis of an image of the rendered version of the document. By determining authenticity based on the PDF code of the document, authentication may take into account several features that are not detectable on the rendered image of a digital-origin document.

The digital-origin document whose authenticity is being determined is referred to herein as the "target document". In one implementation, prior to determining the authenticity of a target document, the document class of the target document is determined. The document class of a target document generally indicates the type of the target document. Examples of document classes include, for example, paystubs, bank statements, and utility bills. Preferably, the document classes are established at a granularity that distinguishes between different-looking documents. Thus, if utility bills from different sources look different, then rather than having a single "utility bill" class, there may be one utility bill class for each source. Further, if a single source of utility bill has several formats/templates for its utility bills, there may be distinct document classes for each of the formats/templates.

Once the document class of a target document has been determined, a set of target features of the target document are compared against corresponding sample features of a sample set of documents that belong to that same document class. In one implementation, a distinct detector corresponds to each of the target features. Each detector receives as input (a) a target feature of the target document, and (b) information relating to the corresponding feature for documents belonging to the same class. The detector then produces a feature-specific anomaly score based on a comparison of the target feature of the target document against what is typical for legitimate documents that belong to the same document class. The feature-specific anomaly score generally indicates a degree of deviation of the target feature relative to the corresponding feature of the documents in the sample set of documents.

The feature-specific anomaly scores produced by the various detectors are then weighted and combined to produce a target document anomaly score. The target document anomaly score indicates the degree to which the target document deviates from the sample set of documents belonging to the target document class. In one implementation, target documents that produce target document anomaly scores that exceed a certain threshold are flagged as "suspect". Documents flagged as suspect may be rejected, quarantined, or redirected for further analysis by human experts.

System Overview

FIG. 1 is a block diagram of a document authentication system 112, according to one implementation. Referring to FIG. 1, a target document 100 is fed to a document classifier 102. The document classifier 102 determines the target document class of the target document 100. The target document class is fed to a class feature repository 104, which retrieves information about the features of a sample set of documents that belong to the target document class.

The features of the target document, and the features of the sample set of documents from the target document class, are fed to a document authentication system 112 which generates a document anomaly score 110. According to one implementation, the document authentication system 112 generates the document anomaly score 110 by feeding target features of the target document into corresponding detectors (Detectors 1 . . . N). Specifically, each detector receives a target feature generated from the target document 100, and information about that same feature for a sample set of documents that belong to the target document class. Each detector produces a feature-specific anomaly score. The feature-specific anomaly scores produced by the detectors are fed to an aggregator 106 that applies feature-specific weights to the feature-specific anomaly scores and combines them to produce the document anomaly score 110. The functioning of each of the various components of the system is described hereafter in greater detail.

The Document Classifier

As mentioned above, document classifier 102 determines the target document class of the target document 100. Document classifier 102 may take any number of forms, including but not limited to a machine learning engine, such as a neural network, trained to classify documents based on images of the rendered versions of the documents. For example, a JPG image may be created of the rendered version of each document in a population of training documents. A neural network may be trained by feeding the neural network with features of the image created for each document in the training set, along with the document class to which the document belongs. Alternatively, such images may be fed to a self-organizing neural network to cause the neural network to categorize the documents based on their appearance.

These are merely examples of how the document classifier 102 may be implemented. The document authentication techniques described herein are not limited to any particular method of determining the document class of a target document. For example, in yet another implementation, the classification of the target document may be done manually, with a human user simply inspecting the target document and entering the target document class information into the system.

The Class Feature Repository

Class feature repository 104 generally represents a repository of information about features of documents. According to one implementation, the information within repository 104 is organized based on document class. Thus, when class feature repository 104 is fed the target document class, class feature repository 104 is able to retrieve information about the features of a set of sample documents that belong to that same document class. For example, if the target document class is a particular version of a particular type of utility bill, then class feature repository 104 retrieves features of other documents that are that same particular version of the same particular type of utility bill. The specific features retrieved from the corresponding sample set of documents is based on the detectors that are implemented by the document authentication system 112. Examples of detectors that may be used in an implementation of document authentication system 112 shall be described in detail hereafter.

Detectors

As mentioned above, each detector of document authentication system 112 is fed a particular feature of the target document, and information relating to that feature for documents in the sample set of documents for the target document class. Significantly, the detectors within document authentication system 112 include detectors that are based on the code of the documents, rather than merely the visual appearance of the rendered version of the documents. Thus, the determination of whether the target document is authentic may hinge on features that are not even visible in the rendered version of the document.

In one implementation, document authentication system 112 analyzes digital-origin documents (e.g. pay stubs, bank statements, etc.) for signs of tampering and creation anomalies using rules and anomaly detection to identify concerning documents. For each document, the document authentication system 112 provides an anomaly score (0-100) predicting the probability of the document has been tampered with or forged. The anomaly score is modeled and aggregated from the feature-specific anomaly scores produced by multiple individual detectors. In one embodiment, those individual detectors include metadata-based detectors and content-based detectors. Metadata-based detectors and content-based detectors shall be described in greater detail hereafter.

Metadata-Based Detectors

Metadata-based detectors attempt to detect, based on metadata associated with the target document, whether some sort of suspect behavior could have taken place to alter or forge a target document. In the case of a PDF document, metadata is extracted from the target PDF document itself and fed to the appropriate metadata-based detector. According to one embodiment, metadata-based detectors may include, among other things, a stripped-metadata detector, a suspicious-software detector, a date mismatch detector, a suspicious-metadata-type detector, and a metadata-anomaly detector.

STRIPPED-METADATA DETECTOR: The stripped-metadata detector analyzes the metadata extracted from the target document. If the there is no metadata information available from extraction, this normally indicates a broken or suspicious PDF format, which is seldom seen from legitimate sources of digital-origin documents. Under these circumstances, the stripped-metadata detector may generate a high feature-specific anomaly score. Alternatively, if the amount of metadata extracted from the target document is within the normal range for documents of the target document class, then the feature-specific anomaly score may be low, or zero. According to one embodiment, the stripped-metadata anomaly score is primarily used to add context and is supplemental to other feature-specific anomaly scores.

SUSPICIOUS-SOFTWARE DETECTOR: The suspicious-software detector generally determines whether the target document's metadata lists a producer, creator, or title containing software from a list of known creators that are suspect. For example, a particular PDF editing application may be commonly used by forgers, and any document showing that PDF editing application as its content creator is suspect. As another example, documents that contain ".xlsx" and ".docx" in the title but not in the content creator have been observed to often be associated with faked documents, and may also cause the suspicious-software detector to generate a high feature-specific anomaly score. According to one embodiment, the suspicious-software detector may include a list of "false alarm cases". The list of false alarm cases indicates situations where the suspicious-software detector would otherwise generate a high-anomaly score, but should not. In response to detecting that the metadata of the target document matches a false alarm case, the suspicious-software detector automatically generates a low feature-specific anomaly score.

DATE-MISMATCH DETECTOR: The date-mismatch detector is configured to generate a high feature-specific anomaly score when the "created" and "modified" dates of the target document do not match. Specifically, if the created date time is mismatched with modified date time, then the target document was probably modified after created by its original source. For non-fillable documents like bank statements or paystubs, digital-origin documents should not have been modified. If the target document has been resaved, there may be a date mismatch without any alteration. Thus, a high feature-specific anomaly score from the date-mismatch detector may simply trigger a further analysis for signs of alteration.

In one implementation, the feature-specific anomaly score of the date-mismatch detector is primarily used to add context and is supplemental to other feature-specific anomaly scores. A high date-mismatch score is evidence that the document has been saved or changed at least once since creation, which is more likely indicate altered/tampered documents rather than true fakes, since true fakes do not always start from a template. Consequently, in one implementation, the date-mismatch anomaly score alone is not enough to indicate fraudulent activity, and therefore is given a relatively lower weight when generating the document anomaly score 110.

SUSPICIOUS-METADATA-TYPE DETECTOR: The legitimate documents in a given target document class tend to have certain metadata types. Thus, target documents that do not have metadata types that are typical to the target document class are suspect. Similarly, target documents that do have metadata types that are not typical to the target document class are also suspect. For example, in the context of PDF documents, typical fields in the metadata of virtually all target document classes include:

Creator
Producer
CreationDate
ModifiedDate
Title
Author

On the other hand, the following metadata types are associated with individual ownership or versioning/changes and therefore their presence should be considered suspicious:

Owner
History
Manifest
OriginalDocumentID
VersionID

According to one implementation, a high suspicious-metadata-type anomaly score alone is not enough to action. However, in combination with other feature-specific anomaly scores, the suspicious-metadata-type anomaly score is further evidence that the target document is suspect. For example, certain target document classes, such as paystubs from a popular legitimate source, should not have a VersionID or OriginalDocumentID.

In one implementation, if the Owner field is available in the target document's metadata, it is compared against the user submitting the target document for analysis, to see if the specified owner makes sense. If the designated owner and the submitter are the same person, it is likely that some other software was used to save a document. In this case, a high suspicious-metadata-type score is more likely to indicate document tampering than ID theft.

METADATA-ANOMALY DETECTOR: The metadata-anomaly detector is configured to find low probability metadata pairs. For example, a popular source of digital-originated documents always uses a producer of "PDFOUT v3.8v by Xenos, inc.". When a non-Xenos producer is observed with "AutoPay output documents" (a document class associated with that particular source), the metadata-anomaly detector will generate a high feature-specific anomaly score to indicate a high likelihood that outside software has been used on the document for tampering.

The metadata-anomaly detector may produce false alarms when users "Print to PDF" a digital document from a browser. The following producers/creators are associated with printing from browsers with a number of versions being observed 1. Quartz (Safari)
2. Skia (Safari)
3. PDFium (Chrome)

In one implementation, when one of these producers is identified in the target PDF document's metadata, the metadata-anomaly detector produces a feature-specific anomaly score that is lower than it would produce if the metadata specifies a non-*Xenos* producer that does not correspond to the print-to-PDF action of a browser.

Content-Based Detectors

Content-based detectors derive feature-specific anomaly scores by scanning the target document for artifacts associated with document tampers/editing. In one implementation, the feature-specific anomaly scores produced by content-based detectors generally have more weight than the feature-specific anomaly scores metadata alerts in terms of anomaly scoring. Content-based detectors used by document authentication system 112 may include but are not limited to an editing-tags detector, a fonts-embedded-types detector, a mask-overlap detector, a multiple-fonts-within-element detector, an annotation-mask detector, a previous-version-hidden detector, and an in-class-code-anomaly detector.

EDITING-TAGS DETECTOR: The editing-tags detector looks for the /MP tag in the decoded PDF code of a target document. In most cases, this instruction is near a "TouchUp_TextEdit" tag in the document, which indicates a change to the PDF. This tag has been used to imply tampering (see, e.g., news.bitcoin.com/expert-witness-in-satoshi-case-claims-dr-wrights-documents-were-doctored). Since PDFs use memory maps to render, adding text to them will corrupt them. These kinds of instructions in the document allow for the PDF rendering software to know where edits are and account for them. In one implementation, the feature-specific anomaly score generated by the editing-tags detectors is given great weight, since editing tags are not normally present in common document classes, such as paystubs or bank statements.

In one implementation, the editing-tags detector attempts to locate where the changes are made based on the location of the touchup tags in the decoded PDF. Note that this is location is imperfect, and an incorrect textbox can be highlighted. If TouchUp_TextEdit tags are present, extra scrutiny to font types, alignment, and math is warranted across the entire document and especially where tags resolve in the rendered, marked up document.

Some types of payroll software use a standard PDF template and append the pay information to the standard template. The tags associated with the append may cause the editing-tags detector to generate a high feature-specific anomaly score for a legitimate target document (a "false positive"). This is very rare and, in one implementation, these situations have been whitelisted. In one embodiment, white listing involves, for certain classes of documents which are usually identified via metadata, those detectors that would otherwise indicate an anomaly are not applied. These false positive cases may, for example, relate to education paystubs. If a W2, tax return, or other editable form is uploaded as a bank statement or paystub then the editing-tags detector also produces false positives. These types of documents are expected to contain touchup tags.

Figure 2:
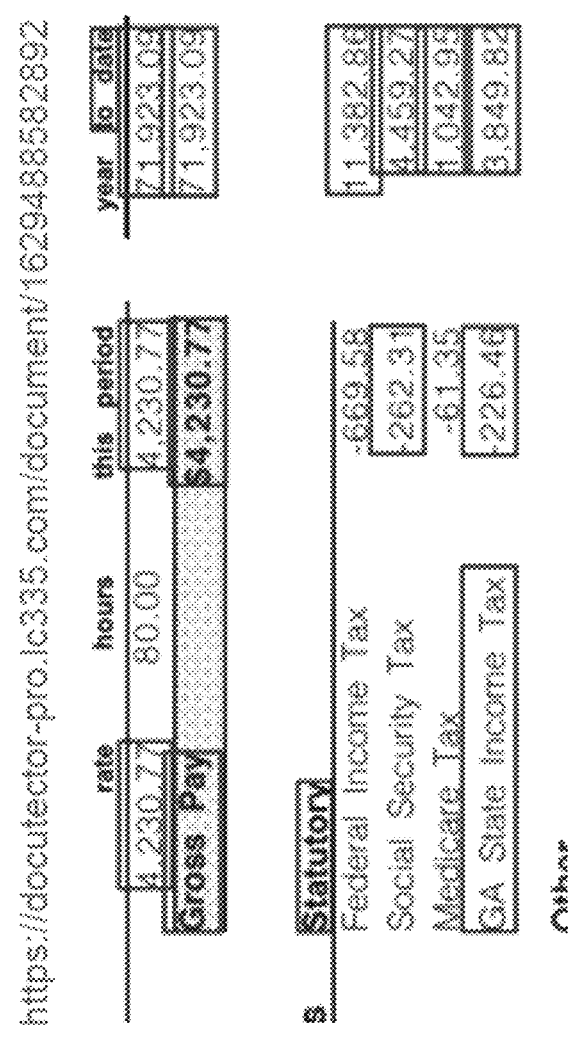

Referring to FIG. 2, it is a block diagram illustrating a user interface for displaying anomalies detected by the editing-tags detector. In the illustrated embodiment, rectangles are drawn around the portions of a rendered target document that are affected by edits indicated by editing tags within the code of the PDF document. In the illustrated embodiment, several critical values are affected by the edits associated with the detected editing tags, so the feature-specific anomaly score generated by the editing-tag detector would be high.

MASK-OVERLAP DETECTOR: According to one implementation, the mask-overlap detector is configured to generate a high feature-specific anomaly score when a text box shows overlap with another textbox. Sometimes when documents are altered, a text box is simply placed over another text box, obscuring the original text and replacing it with the text in the new text box. The mask-overlap detector finds overlapping text boxes and reveals hidden content beneath the top layer. According to one implementation, the mask-overlap detector will also generate a high feature-specific anomaly score when a target document is tampered with because the edits ruin the alignments in the PDFs. In these cases, text boxes will be highlighted but no useful information will be revealed.

Some legitimate documents have overlapping text boxes. However, most popular sources of digital-origin documents tend to not do this. When the mask-overlap detector generates a high feature-specific anomaly score for one of the popular sources, the document should be treated as suspect as something has likely thrown off document alignment.

Figure 3:
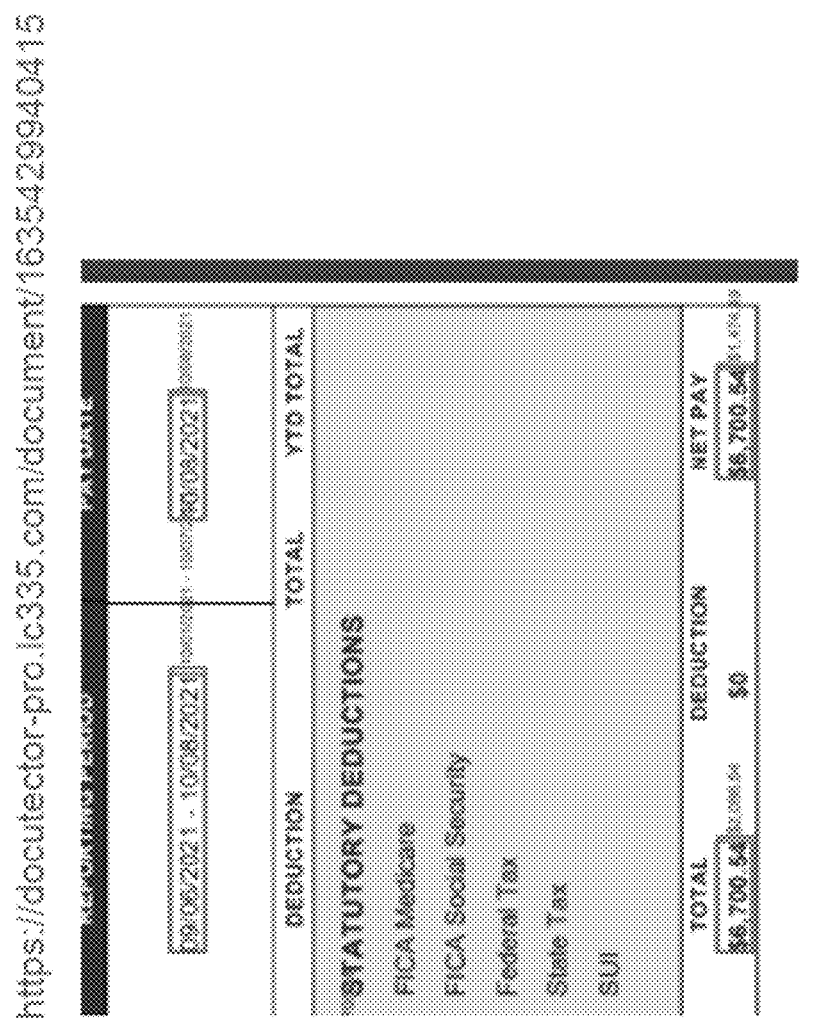

FIG. 3 is a block diagram of a user interface for displaying anomalies detected by the mask-overlap detector. In the embodiment illustrated in FIG. 3, boxes are displayed over the portion of the rendered target document that is covered by a masking textbox. In addition, the values that are covered up by the masking textbox are displayed adjacent to the box, preferable in a color that distinguishes the covered-up values from those shown in the rendered document. By displaying the results of mask-overlap detector in this manner, a user may not only see which portions of the document were tampered with, but also the original values that were covered up.

Figure 4:
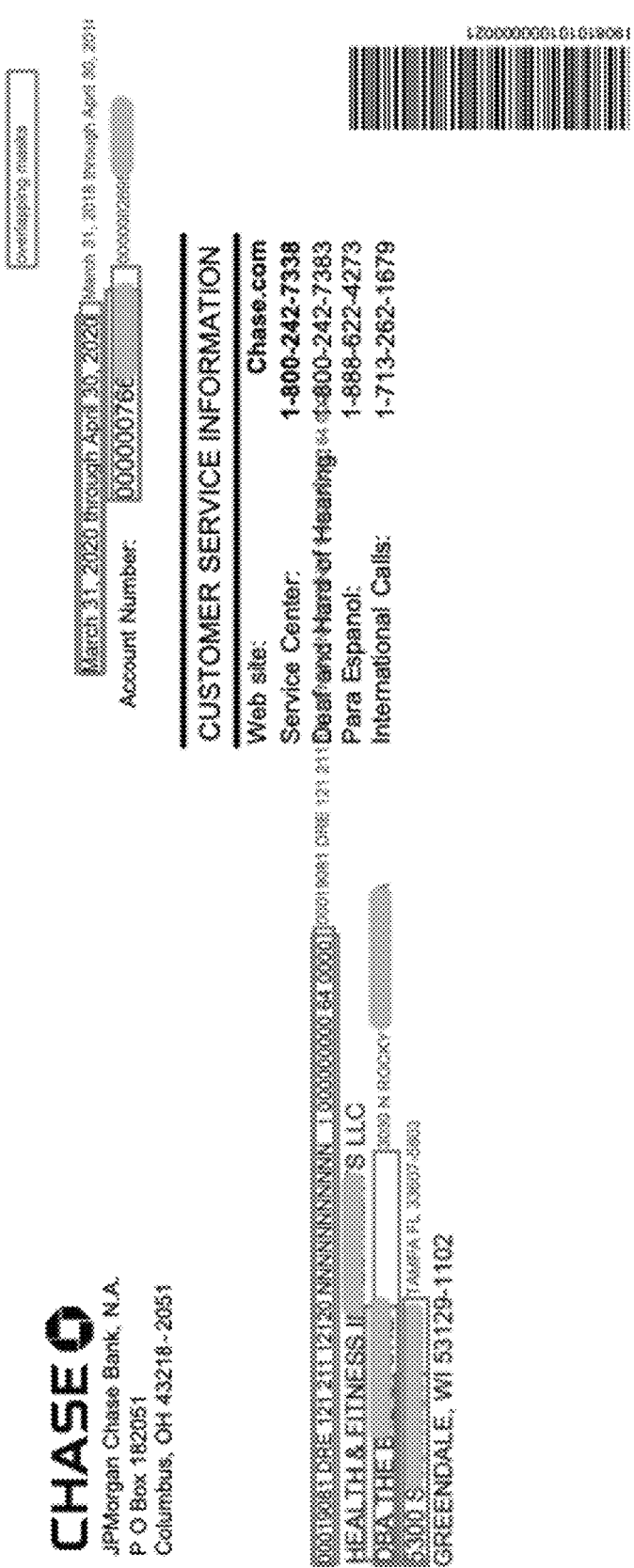
FIG. 4 is a block diagram of another user interface displaying regions that correspond to mask-overlap anomalies.

FIG. 4 is a block diagram showing another example of how anomalies detected by the mask-overlap detector may be displayed to the user. Similar to FIG. 3, in the example illustrated in FIG. 4, boxes are displayed over the portion of the rendered target document that are covered by masking text boxes. Adjacent to the boxes are displayed the values that are covered by the masking text boxes. In the example illustrated in FIG. 4, the target document has been tampered with by masking the original time period with new dates, the original account number with a new account number, and the original address with a new address.

FONTS-EMBEDDED-TYPES DETECTOR: The fonts-embedded-types detector determines whether the target document contains both embedded and non-embedded fonts. The use of a fonts-embedded-types detector is based on the observation that fonts types of most bank statements are either all embedded or none embedded. If text has been injected into a PDF document after creation, the embedded/nonembedded state of the injected text often does not match the embedded/nonembedded state of the original document. Therefore, containing both is suspicious, especially if it contains the same font which is both embedded and non-embedded.

MULTIPLE-FONTS-TYPES-WITHIN-ELEMENT DETECTOR: The multiple-fonts-types-within-element detector analyzes the PDF code of the target document to identify any text boxes that contain multiple fonts. Sometimes when a document is altered, the wrong font will be injected into a text box causing multiple fonts that look alike but are actually different in the same text box. Normally fonts are the same inside of a text box with, a few exceptions.

In some cases, sources of digital-origin documents will use special characters, specifically dollar signs and periods in a different font than the rest of the document. If multiple font types are detected in an area that contains a dollar value, there is a chance that is what is causing the multiple-fontstypes. Therefore, in one implementation, the multiple-fonts-types-within-element detector only generates a high feature-specific anomaly score when the element containing the multiple fonts does not contain a dollar amount.

FIG. 5 is a block diagram illustrating a user interface for displaying anomalies identified by the multiple-fonts-types-within-element detector, according to an implementation. In the illustrated example, boxes are drawn around the portions of the rendered target document that correspond to elements with multiple font types. For example, the line "Beginning balance on Jan. 5, 2021" is rendered in the Helvetica fount, while the line "Ending balance on Feb. 25, 2021" is rendered in the Arial font.

ANNOTATION-MASKS DETECTOR: The annotation-masks detector detects when annotations have been added to a PDF. Annotations are not part of the original document. Sometimes when a document is altered, annotations will be added in an attempt to cover up textboxes with other text. Annotations may be malicious or benign. For example, an annotation that covers up a salary amount with a fake amount is clearly malicious. However, an annotation that simply circles or otherwise explains something in the original target document may be benign. Therefore, in one embodiment, a target document that generates a high annotation-mask anomaly score may be manually inspected. In particular, a PDF of the target document may be downloaded. Annotations are typically movable when viewed in a PDF reader. Consequently, when the PDF with an annotation is opened with Adobe Acrobat or Preview (for Macs) the boxes in question can be moved around and a decision can be made as whether it was there legitimately or as an attempt to deceive.

FIG. 6 is a block diagram of a user interface that may be used to display anomalies identified by an annotation-masks detector, according to one implementation. In the displayed example, an annotation has been placed over a check date, which is likely to be a malicious annotation intended to mask the correct check date. In contrast, FIG. 7 is a block diagram that illustrates an example of a benign annotation, where the user makes no attempt to cover the original data, but instead circles the original value and adds a (presumably) correct value next to the original value without obscuring the original value.

PREVIOUS-VERSION-HIDDEN DETECTOR: the previous-version-hidden detector detects when previous version information is detected in the PDF code of the target document. The existence of previous version information is an indicator the original version of the PDF has been modified. A high previous-version-hidden anomaly score should warn an investigator that tampering may have occurred. However, a high previous-version-hidden anomaly score does not do much in the way of guiding to the actual tamper locations. Certain software will modify an original PDF as its means of operating. Typically, large sources of digital-origin documents will not do this, so if its present, for example, on paystubs/bank statements from the larger groups, the target documents are particularly suspect and imply potential tampering.

IN-CLASS-CODE-ANOMALY DETECTOR: The PDF reference located at www.adobe.com/content/dam/acom/en/devnet/pdf/pdfs/pdf_reference_archives/PDFReference.p df explains what the tags within a PDF are for. An in-class-code-anomaly detector is a detector that produces high feature-specific anomaly score when something about the code of a target document deviates significantly from the code in legitimate documents that belong to the target document class. One example of an in-class-code-anomaly detector is an anomalous-tag-count detector.

An anomalous-tag-count detector detects likelihood of fraud by comparing (a) number of occurrences of each tag in the PDF code of the target document, with (b) a typical number of occurrences of each tag within legitimate documents that belong to the target document class. The comparison can be performed, for example, by creating a target document feature vector, where each element in the vector corresponds to a particular tag and the value of the element is the count of occurrences of the tag in the target document. The target document feature vector may then be compared against similar feature vectors created for the sample set of legitimate documents that belong to the target document class.

Figure 8:
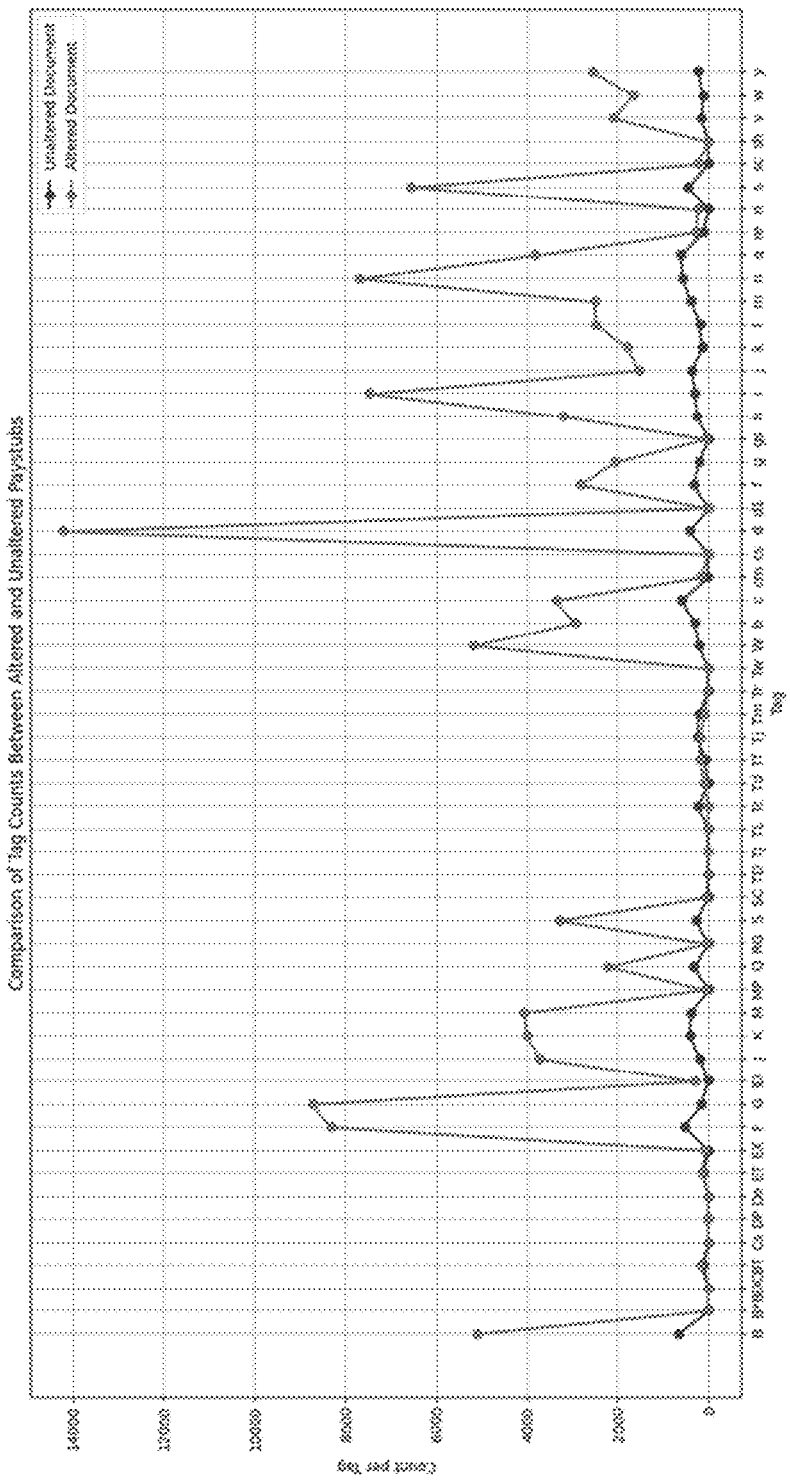
FIG. 8 is a chart that shows a comparison between (a) how many occurrences there are of each tag in a legitimate document of the "paystub" class, and (b) how many occurrences there are of each tag in an altered target document of the "paystub" class.

For example, FIG. 8 is a chart that shows a comparison between (a) how many occurrences there are of each tag in a legitimate document of the "paystub" class, and (b) how many occurrences there are of each tag in an altered target document of the "paystub" class. As is evident by the chart of FIG. 8, fraudulent paystubs tend to have a much higher count of certain tags than legitimate paystubs. When the anomalous-tag-count detector detects that the number of a given tag within the target document deviates significantly from the typical number of that given tag in legitimate documents of the target document class, the anomalous-tag-count detector generates a high feature-specific anomaly score. On the other hand, if the tag counts in the target document are consistent with the tag counts of legitimate documents in the target document class, the anomalous-tag-count detector generates a low feature-specific anomaly score.

As another example of an in-class-code-anomaly detector, the PDF code of legitimate documents from certain document classes may nearly always have tags from an "expected set" of tags, and may rarely have tags from a "unexpected set" of tags. Thus, an in-class-code-anomaly detector may be used to detect situations in which the target document does not have some tags that belong to the expected set, and/or does have some tags that belong to the unexpected set.

In one implementation, the anomalous-tag-count detector counts tags on a per-object basis, rather than a per-document basis. For example, the PDF code for a particular document class may typically define N objects, each of which may have any number of tags. In this example, the anomalous-tag-count detector may make a distinct "histogram" of tag counts for each of the N objects. For the purpose of detecting anomalies, the histogram for each object in the target document may be compared to the histograms of the corresponding objects in the sample set of documents of that particular document class. The target document may be treated as anomalous if the objects within the target document differ from those in the sample population, or the histograms of any object within the document differs significantly from the corresponding histograms from the sample set of the target document class.

Combining Feature-Specific Anomaly Scores

As explained above, the feature-specific anomaly scores may be combined by the document authentication system 112 to generate a document anomaly score 110. According to one embodiment, each detector $D_i$ is assigned a confidence score. Both the detectors and the confidence scores differ based on the target document class. For example, a document class in which legitimate documents frequently have both embedded and non-embedded fonts, the fonts-embedded-types detector may give given a low weight, or not used at all. In contrast, the output of the fonts-embeddedtypes detector may be heavily weighted for a document class in which mixing embedded and non-embedded fonts is rare.

The confidence score generally reflects the probability that a target document exhibiting the behavior $b_i$ associated with $D_i$ is fraudulent. Thus, the confidence score for the mask-overlap detector generally reflects the probability that the target document exhibiting a suspicious mask-overlap, as detected by the mask-overlap detector, is fraudulent. This may be stated in formula form as:

$$p(x \text{ is bad because it exhibits } b_i \mid D_i) = \begin{cases} s_i, & \text{if } x \in D_i \\ 0, & \text{otherwise} \end{cases}$$

where $x \in D_i$ means indicator x is in the output of detector $D_i$. If the set of detector outputs is $D=\{D_1, D_2, \ldots D_n\}$, then the aggregate score for each indicator x is defined as:

$$s(x) = P(x \text{ bad} \mid D) \triangleq P\left(\bigcup_{i=1}^{n} x \text{ bad bc it exhibits } b_i \mid D\right)$$

$$= 1 - P\left(\bigcap_{i=1}^{n} \overline{x \text{ bad bc it exhibits } b_i} \mid D\right)$$

Assuming independence of the detectors and their associated behaviors:

$$= 1 - \prod_{i=1}^{n} P(\overline{x \text{ bad bc it exhibits } b_i} \mid D)$$

$$= 1 - \prod_{i=1}^{n} (1 - P(x \text{ bad bc it exhibits } b_i \mid D))$$

Further assuming that each detector is written to detect each behavior independently, the formula is reduced to:

$$s(x) = 1 - \prod_{i=1}^{n} (1 - P(x \text{ bad bc it exhibits } b_i \mid D_i))$$

This final equation produces the final score for any a document based on whether the document produces a high anomaly score in each detector. For example, assume that document authentication system 112 has only three detectors, and that the detectors have confidence scores of 0.9, 0.5 and 0.1, respectively. Under these circumstances, a target document that causes detectors 1 and 3 to generate high anomaly scores would have a document anomaly score of: s(target document)=1−(1−0.9)*(1−0)*(1−0.1)=1−(0.1*1*0.9)=0.91

This is merely one example of a technique that may be used by aggregator 106 to combine scores from detectors to generate a document anomaly score. The automated document authentication techniques described herein are not limited to any particular feature-specific score aggregation technique.

Finer-Granularity Authentication Systems

In the implementation illustrated in FIG. 1, all detectors 1 . . . N are part of a single monolithic document authentication system 112 that constructs a single document anomaly score 110 based on the feature-specific anomaly scores generated by all of the detectors 1 . . . N. However, the granularity of authentication systems may vary from implementation to implementation. For example, in an alternative implementation, all detectors relating to whether the target document originated with a legitimate source may be combined in an "origination validation system" that generates a "faked document score". Similarly, all detectors relating to whether a document was tampered with after being created by a legitimate source may be combined in a "tamper detection system" that generates a "tampered-with score". At the finest level of granularity, each detector 1 . . . N may constitute a distinct fraud detection system, and may independently trigger corrective actions when the feature-specific anomaly score produced thereby is above a predetermined threshold. The techniques described herein are not limited to use of any particular detector, or any particular set of detectors, for generating a document anomaly score 110.

User-Interface for Presenting Detected Anomalies

FIGS. 2-6 are examples of user interfaces that may be displayed to a user of document authentication system 112. In the user interfaces, the target document is rendered, and various annotations are superimposed on the displayed image of the target document. The annotations generally include boxes that approximately indicate the area of the target document that corresponds to a detected anomaly. Additional information may be displayed in association with such boxes. For example, FIG. 2 illustrates portions of a target document that were edited (as evidenced by editing tags). FIGS. 3 and 4 illustrate portions of a target document that have overlapping text boxes. In FIGS. 3 and 4, adjacent to each of the overlapping text boxes, the user interface displays the content of the original (covered up) text box.

According to one embodiment, the annotations used to present anomalies to a user are color-coded based on the detector that detected the anomaly. Thus, anomalies detected by the editing tag detector may be indicated by blue boxes. In contrast, anomalies detected by the mask overlap detector may be indicated by red boxes, and text that was covered up by a masking text box may also be displayed as red. Similarly, bad annotations (used to fraudulently replace/hide original information) may be indicated with purple boxes, accompanied by purple explanatory text.

In addition, the display generated by the user interface may depict the document anomaly score, and indicate how the document anomaly score was generated. With respect to how the document anomaly score was generated, the user interface may display an indication of which detectors produce high feature-specific anomaly scores, and the weight that was given to the results of each of those detectors.

In addition to displaying the document anomaly score and how the document anomaly score was generated, the user interface may further include a presentation "next steps" an analyst should perform based on the detector(s) the fired. For example, editing around a bank statement date might cause the user interface to display an alert that instructs the analyst to review the Plaid data verify whether the deposits match. This is merely one example of a "next steps" alert that may be presented by the user interface in response to detection of anomalies, based on the type of anomaly detected.

Captured-Image Documents

The document authentication system described above works well for situations where the target document purports to be a digital-origin document in PDF format. However, in some situations the only version of a document that is available to a document authentication system may be a photo of a physical document. In such cases, detectors that rely on an analysis of the PDF code and/or metadata of a document may not have the information they need to perform their analysis. For example, if a user is asked to upload a photo ID, they may simply upload a digital photograph of their driver's license. Under these circumstances, detectors that perform an analysis of PDF code will not be useable.

According to one implementation, rather than simply attempting to detect artifacts of tampering within the digital image (e.g. change in fonts, misalignments, etc.), the document authentication system may include a "common-surrounding-content detector". A common-surrounding-content detector background detector makes use of the fact that a digital photograph of a physical document usually captures content surrounding the document. For example, a photo of a driver's license that is photographed on a tabletop will typically display some part of the tabletop. Thus, in this example, the portion(s) of the tabletop that are captured in the image of the driver's license would constitute "surrounding content".

When two different users independently photograph their driver's licenses, it is highly unlikely that the surrounding content of the two photographs will match. For example, even if both photographs are taken on wooden tables, the pattern of the grains of the wooden tables within each image will be different. If the photo of one user's document has surrounding content that substantially matches the surrounding content of a photo of another unrelated user's document, then it is likely that both documents have been faked by the same source.

Based on the foregoing, the common-surrounding-content detector attempts to match the surrounding content of a photographed document with surrounding content of photographed documents from other users. The closer the match between the surrounding content, and the greater the number of other users whose photos have matching surrounding content, the higher the anomaly score produced by the common-surrounding-content detector.

Figure 9:
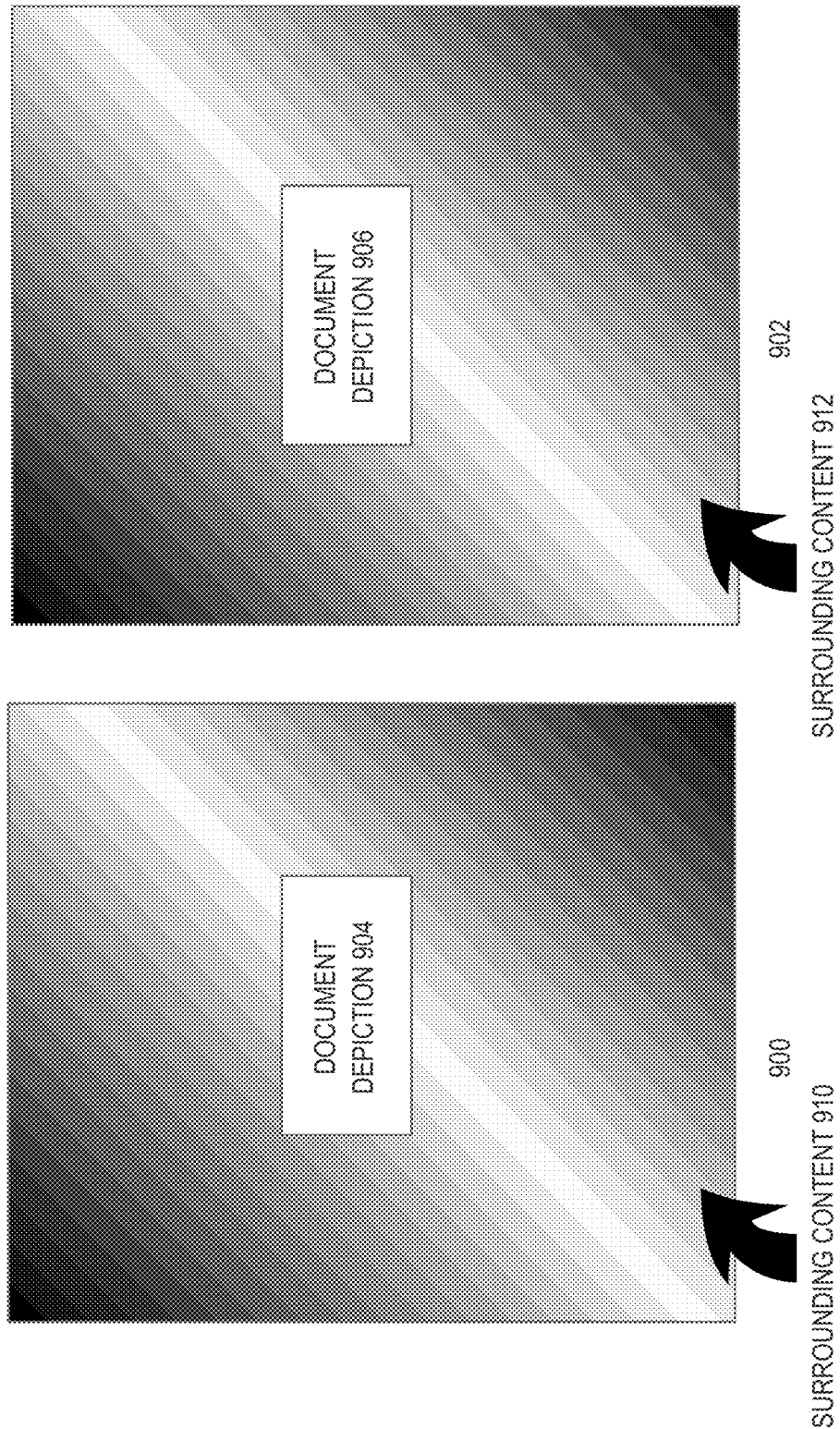
FIG. 9 is a block diagram illustrating two captured images of documents, where the surrounding content of the images is identical.

Referring to FIG. 9, it illustrates two captured images 900 and 902. Both images 900 and 902 include a region that depicts a document. Specifically, captured image 900 includes document depiction 904, and captured image 902 includes document depiction 902. The document depictions only cover a portion of the captured images 900 and 902. The remainder of the captured images 900 and 902 constitute surrounding-content. Specifically, captured image 900 includes surrounding-content 910, and captured image 902 includes surrounding-content 912. Even though the depicted documents may be completely different (e.g. driver's licenses issued to different people from different states), the fact that surrounding content 910 exactly matches surrounding content 912 is an indication that both documents may be faked by the same malicious source.

Remedial Measures

The remedial measures taken in response to the document authentication system 112 generating a high document anomaly score for a target document may vary from implementation to implementation. The document authentication techniques described herein are not limited to any particular type of remedial measure. The remedial measures will largely hinge on the context in which the authentication operation is performed. For example, in the context of criminal investigations, the document anomaly score may serve as evidence or trigger the need for further investigation. In the context of a loan application, a high document anomaly score may trigger a rejection of the loan, cause the target document to be quarantined, trigger further human analysis, or trigger a request for additional supporting documents.

In some contexts, the output of the document authentication system 112 may trigger actions in response to low document anomaly scores. For example, in the context of a loan application, certain features that are unrelated to the uploaded documents (such as the IP address of the applicant, or the email address of the applicant) may be suspicious. However, if all documents uploaded by the applicant produce low document anomaly scores (and are therefore likely to be legitimate), then a fraud investigation that would otherwise occur may be bypassed.

In one implementation, the anomalies detected by the detectors may be used as input to a fraud classification tool that is configured to categorize the type of fraudulent action that is reflected in a target document. For example, if the anomalies include edits in which a name on a bank statement is changed, or masked by later-added annotations or text boxes, then feeding those anomalies to a fraud classification tool may produce the classification of "identity theft". On the other hand, if numerous anomalies indicate that the code of a target document deviates significantly from the code that would be produced by the legitimate source associate with the target document class, then the fraud classification tool may produce the classification of "faked document".

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 10:
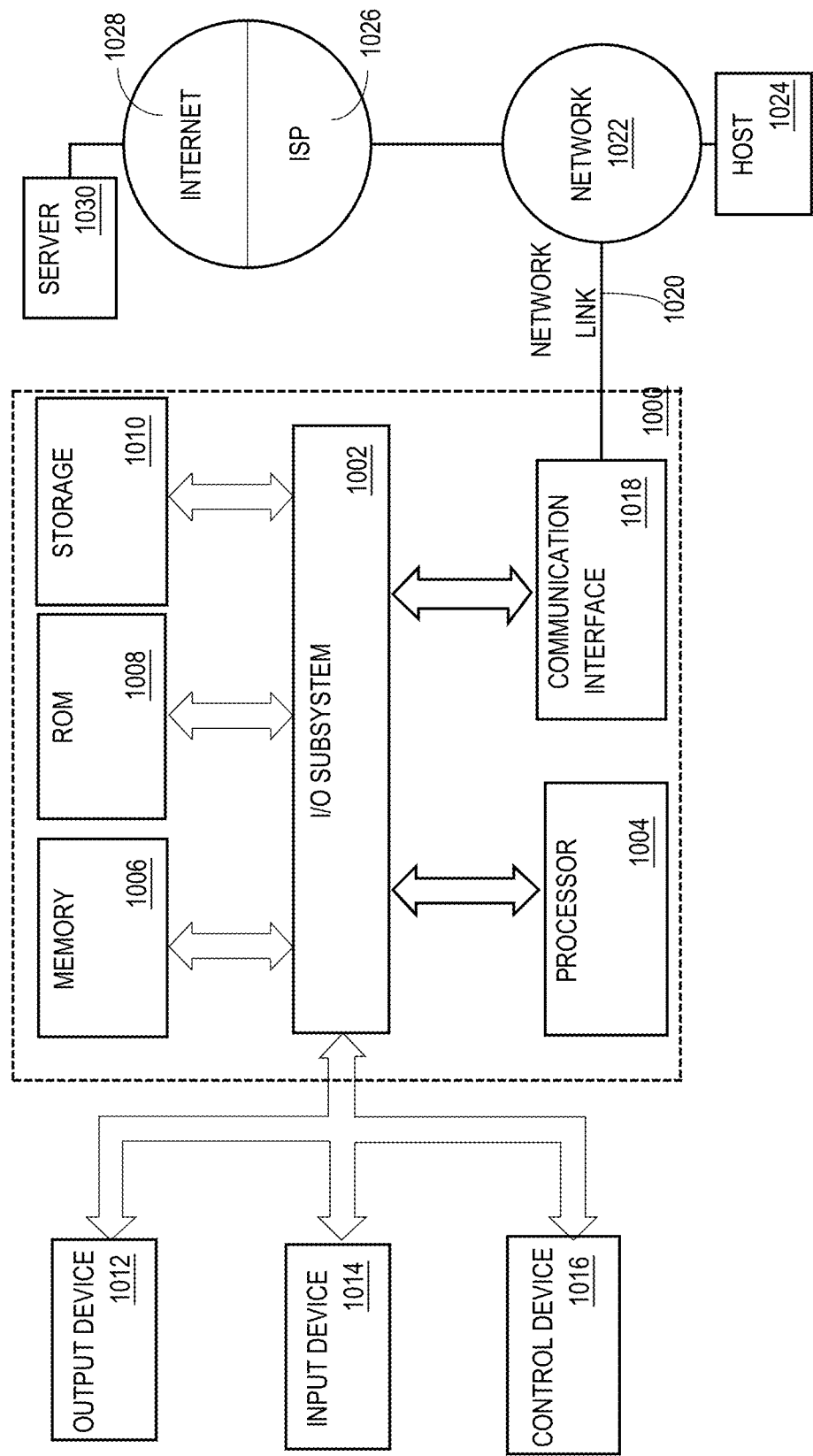
FIG. 10 is a block diagram of a computer system that may be used to implement a document authentication system that uses the techniques described herein.

For example, FIG. 10 is a block diagram that illustrates a computer system 1000 upon which an embodiment of the invention may be implemented. Computer system 1000 includes a bus 1002 or other communication mechanism for communicating information, and a hardware processor 1004 coupled with bus 1002 for processing information. Hardware processor 1004 may be, for example, a general purpose microprocessor.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid-state drive is provided and coupled to bus 1002 for storing information and instructions.

Computer system 1000 may be coupled via bus 1002 to a display 1012, such as a cathode ray tube (CRT), for displaying information to a computer user. An input device 1014, including alphanumeric and other keys, is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1010. Volatile media includes dynamic memory, such as main memory 1006. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid-state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code may be executed by processor 1004 as it is received, and/or stored in storage device 1010, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
receiving, at a document authentication system, a target document file that corresponds to a target document;
wherein the target document is in a format in which visual display of the target document is rendered based on target document code contained the target document file;
obtaining, at the document authentication system, information that indicates a target document class of the target document;

wherein the document authentication system includes a set of one or more detectors;

wherein the one or more detectors includes an in-class-code-anomaly detector;

using the in-class-code-anomaly detector, the document authentication system performing a comparison between (a) a feature of the target document code, and (b) a corresponding feature of sample set code contained in a sample set of documents that belong to the target document class, wherein the sample set of documents contains a plurality of documents;

based on the comparison, the in-class-code-anomaly detector generating a feature-specific anomaly score that reflects a degree of deviation between the feature of the target document code and the corresponding feature of the sample set code; and based at least in part on the feature-specific anomaly score, the document authentication system generating a document anomaly score that indicates a likelihood that the target document is authentic;

wherein the method is performed by one or more computing devices.

2. The method of claim 1 further comprising:
based on the document anomaly score, the document authentication performing at least one of:
  indicating that the target document is authentic responsive to the document anomaly score falling below a first threshold, or
  indicating that the target document is not authentic responsive to the document anomaly score exceeding a second threshold.

3. The method of claim 1 wherein:
the in-class-code-anomaly detector is an anomalous-tag-count detector; and
performing the comparison comprises performing a comparison between a number of occurrences of each tag in the target document code with a number of occurrences of each tag in the sample set code of each document in the sample set of documents.

4. The method of claim 1 wherein performing the comparison comprises comparing tags contained in the target document code against at least one of:
an expected set of tags that occur regularly in the sample set code, or an unexpected set of tags that occur rarely or never in the sample set code.

5. The method of claim 1 wherein:
the feature-specific anomaly score is a first feature-specific anomaly score upon which the document anomaly score is based;
the set of one or more detectors includes a stripped-metadata detector; and
generating the document anomaly score is based, at least in part, on a second feature-specific anomaly score generated by the stripped-metadata detector.

6. The method of claim 1 wherein:
the feature-specific anomaly score is a first feature-specific anomaly score upon which the document anomaly score is based;
the set of one or more detectors includes a suspicious-software detector; and
generating the document anomaly score is based, at least in part, on a second feature-specific anomaly score generated by the suspicious-software detector.

7. The method of claim 1 wherein:
the feature-specific anomaly score is a first feature-specific anomaly score upon which the document anomaly score is based;
the set of one or more detectors includes a date-mismatch detector; and
generating the document anomaly score is based, at least in part, on a second feature-specific anomaly score generated by the date-mismatch detector.

8. The method of claim 1 wherein:
the feature-specific anomaly score is a first feature-specific anomaly score upon which the document anomaly score is based;
the set of one or more detectors includes a suspicious-metadata-type detector; and
generating the document anomaly score is based, at least in part, on a second feature-specific anomaly score generated by the suspicious-metadata-type detector.

9. The method of claim 1 wherein:
the feature-specific anomaly score is a first feature-specific anomaly score upon which the document anomaly score is based;
the set of one or more detectors includes a metadata-anomaly detector; and
generating the document anomaly score is based, at least in part, on a second feature-specific anomaly score generated by the metadata-anomaly detector.

10. The method of claim 1 wherein:
the feature-specific anomaly score is a first feature-specific anomaly score upon which the document anomaly score is based;
the set of one or more detectors includes an editing-tags detector; and
generating the document anomaly score is based, at least in part, on a second feature-specific anomaly score generated by the editing-tags detector.

11. The method of claim 1 wherein:
the feature-specific anomaly score is a first feature-specific anomaly score upon which the document anomaly score is based;
the set of one or more detectors includes a mask-overlap detector; and
generating the document anomaly score is based, at least in part, on a second feature-specific anomaly score generated by the mask-overlap detector.

12. The method of claim 1 wherein:
the feature-specific anomaly score is a first feature-specific anomaly score upon which the document anomaly score is based;
the set of one or more detectors includes a fonts-embedded-types detector; and
generating the document anomaly score is based, at least in part, on a second feature-specific anomaly score generated by the fonts-embedded-types detector.

13. The method of claim 1 wherein:
the feature-specific anomaly score is a first feature-specific anomaly score upon which the document anomaly score is based;
the set of one or more detectors includes a multiple-fonts-types-within-element detector; and
generating the document anomaly score is based, at least in part, on a second feature-specific anomaly score generated by the multiple-fonts-types-within-element detector.

14. The method of claim 1 wherein:
the feature-specific anomaly score is a first feature-specific anomaly score upon which the document anomaly score is based;
the set of one or more detectors includes an annotation-masks detector; and generating the document anomaly score is based, at least in part, on a second feature-specific anomaly score generated by the annotation-masks detector.

15. The method of claim 1 wherein:

the feature-specific anomaly score is a first feature-specific anomaly score upon which the document anomaly score is based;

the set of one or more detectors includes a previous-version-hidden detector; and generating the document anomaly score is based, at least in part, on a second feature-specific anomaly score generated by the previous-version-hidden detector.

16. The method of claim 1 further comprising generating a user interface that displays:

an image of the target document as rendered based on the target document code; and overlayed on the image of the target document, indications of regions of the target document that correspond to anomalies detected by the one or more detectors.

17. The method of claim 16 wherein:

the anomaly associated with a particular region hides content that would otherwise be depicted in the image of the target document; and the method further comprising displaying the content in association with the indication of the region that is associated with the anomaly.

18. The method of claim 16 wherein:

the anomalies detected by the one or more detectors include:

a first set of one or anomalies detected by a first detector; and a second set of one or more anomalies detected by a second detector;

the indications of the regions that correspond to the first set of one or more anomalies are depicted in a first color that is different than a second color used for indications of the regions that correspond to the second set of one or more anomalies.

\* \* \* \* \*